United States Patent [19]

Ebina et al.

[11] Patent Number: 5,108,818

[45] Date of Patent: Apr. 28, 1992

[54] SURFACE-PATTERNED POLYBUTYLENE TEREPHTHALATE RESIN MOLDED ARTICLES AND PROCESS FOR PREPARING SUCH MOLDED ARTICLES

[75] Inventors: Yoichi Ebina, Osaka; Shigeru Nedzu; Terutaka Sano, both of Shizuoka, all of Japan

[73] Assignee: Polyplastics Co., Ltd., Osaka, Japan

[21] Appl. No.: 564,466

[22] Filed: Aug. 9, 1990

[30] Foreign Application Priority Data

Aug. 9, 1989 [JP] Japan .................................. 1-206337

[51] Int. Cl.$^5$ .............................................. B32B 9/00
[52] U.S. Cl. ................................. 428/195; 428/204; 428/206; 428/411.1; 264/129; 8/456; 8/471
[58] Field of Search ................... 264/129, 456, 471; 524/98, 281, 539; 428/195, 204, 206, 411.1

[56] References Cited

U.S. PATENT DOCUMENTS

| | | | |
|---|---|---|---|
| 4,080,360 | 3/1978 | Schlichting et al. | 524/98 |
| 4,131,595 | 12/1978 | Breitenfillner et al. | 524/539 |
| 4,369,280 | 1/1983 | Dieck et al. | 524/281 |
| 4,764,177 | 8/1988 | Sims et al. | 8/471 |
| 4,820,310 | 4/1989 | Fukui | 8/456 |
| 4,844,851 | 7/1919 | Hotta et al. | 264/129 |

*Primary Examiner*—Patrick J. Ryan
*Attorney, Agent, or Firm*—Nixon & Vanderhye

[57] ABSTRACT

A surface-patterned, injection-molded article of polybutylene terephthalate (PBT) is produced by placing a film composed mainly of a polyester resin and backprinted with a desired graphic and/or indicia pattern in a mold cavity so that the printed surface of the film will be in contact with PBT resin to be injected thereinto. The polyester resin film has a melting point between 10° C. to 60° C. less than the melting point of the injected PBT. Molten resin composed mainly of polybutylene terephthalate is then injected into the mold cavity to cause the pattern-printed film to at least partially plasticize and thereby integrally meld (bond) onto a corresponding surface of the resulting molded PBT article.

13 Claims, 2 Drawing Sheets

SURFACE-PATTERNED POLYBUTYLENE TEREPHTHALATE RESIN MOLDED ARTICLES AND PROCESS FOR PREPARING SUCH MOLDED ARTICLES

CROSS-REFERENCE TO RELATED APPLICATIONS

This application is related to commonly owned and copending U.S. application Ser. No. 07/548,303 filed in the name of the same applicants as the present application on Jul. 5, 1990, and U.S. application Ser. No. 07/557,719, filed on Jul. 26, 1990, the entire content of each said copending application being expressly incorporated hereinto by reference.

FIELD OF INVENTION

The present invention relates to polybutylene terephthalate resin molded articles having a graphic and/or indicia pattern (including letters, figures, symbols and the like) formed on a surface thereof, and to processes for preparing such molded articles.

BACKGROUND AND SUMMARY OF THE INVENTION

Molded resin articles have been decorated in the past with graphic and/or indicia patterns (such as letters, figures, symbols and the like) using known foil-decorating techniques. According to the foil-decorating technique, a molded surface-patterned article is prepared by placing in a mold cavity a resin film bearing a selected graphic and/or indicia pattern, filling the mold cavity with a molten resin (or a resin prepolymer) and then compressing the thus obtained molded article under heat and pressure to integrate the film onto a surface of the molded article. In the case of thermosetting resins, this heat and pressure treatment serves to cause the resin to react further.

The foil-decorating technique has been used extensively to decorate the surfaces of molded articles formed of thermosetting resins (e.g. melamine resin) with pictorial patterns. However, when thermosetting resins are used to form surface-patterned articles, the steps employed in foil-decorating become relatively complex thereby increasing the costs associated with manufacturing such articles. Accordingly, the use of foil-decorating techniques using thermoplastic resins has recently gained more attention because molded articles of thermoplastic resins are more easily obtained by injection molding techniques, resulting in lower production costs. In this regard, foil-decorated injection-molded articles using polyolefins, such as polypropylene have been commercialized.

The thermoplastic polyolefin resins that have typically been used in foil-decorating techniques generally exhibit poor heat resistance, strength and rigidity. Thus, although these typical resins can be used to form injection-molded articles that may be employed in some end-use applications, they cannot usually be employed in end-use applications where severe conditions may be encountered. In the case of injection-molded tableware, food vessels or trays, for example, a number of additional performance requirements must be met. Specifically, the odor and/or color of food must not migrate into the resin. Conversely the odor and/or "taste" of the resin should not migrate into the food.

Molded articles satisfying all of the foregoing requirements have not been developed to date. It is therefore towards fulfilling such a need that the present invention is directed.

The present invention broadly resides in foil-decorated surface-patterned articles whereby a back-printed film of a polyester resin is adhered to a surface region of a body comprised of a different PBT resin. In this regard, PBT resins have not been used previously as a substrate body for foil-decorations.

More specifically, in accordance with the present invention, a process for preparing a surface-decorated polybutylene terephthalate resin molded article (i.e., having a graphic and/or indicia pattern formed on a surface of the article) is especially characterized by placing a film composed mainly of a polyester (preferably polybutylene terephthalate) resin having a melting point which is 10° C. to 60° C. less than the melting point of the PBT resin forming the article's body, and back-printed with the desired pattern, in a cavity of a mold so that the printed surface of the film will be in contact with the subsequently injected PBT body resin. Molten PBT resin comprised of polybutylene terephthalate is then injected into the mold cavity to fill the same and to cause the polyester film to at least partially plasticize. As a result, the polyester film integrally coalesces (bonds) onto a surface portion of the molded PBT resin article. The resulting equally novel molded article prepared according to this process will thereby have a surface which corresponds to the film, and will exhibit the pattern associated with that film.

BRIEF DESCRIPTION OF THE ACCOMPANYING DRAWINGS

Reference will hereinafter be made to the accompanying drawings wherein like reference numerals throughout the various Figures denote like structural elements, and wherein.

DETAILED DESCRIPTION OF THE PREFERRED EXEMPLARY EMBODIMENTS

Figure 1A:
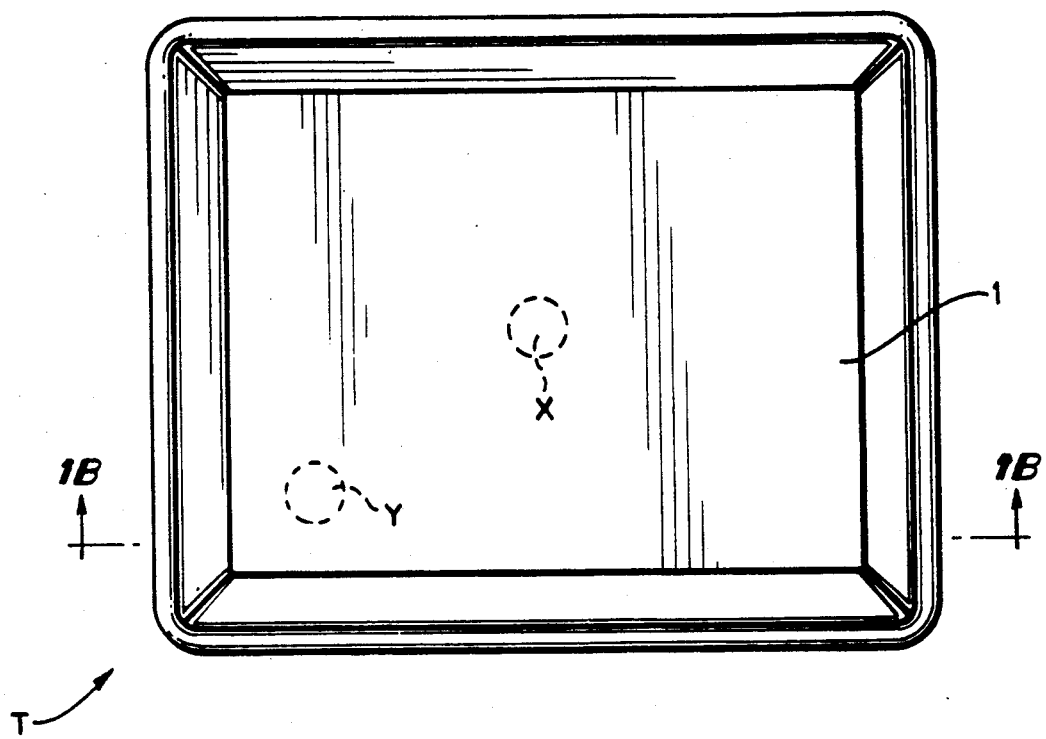
FIG. 1A is a top plan view of a surface-patterned article (tray) employed in the Examples to be discussed below.

According to the present invention, a film comprised of a polyester (preferably PBT) terephthalate resin and having a melting point which is 10° C. to 60° C. less than the melting point of the PBT resin forming the body of the article is first back-printed with a pictorial pattern.

The film used in the present invention is preferably a so-called "back-printed" transparent film. That is, the film used is one where the desired pattern is reverse-printed on the film's back surface so that the intended pattern is visibly perceptible when the film is observed from the film's front surface (i.e., through the film's thickness). In this regard, if the melting point of the polyester resin forming the back-printed film is too high and exceeds this range, the adhesion of the film to the molded article (especially adhesion after treatment with hot water or detergent) is insufficient. On the other hand, if the melting point of the polyester resin forming the back-printed film is too low and below the above-mentioned range, the film may be excessively softened by the heat of the injection molding process and as a result, may elongate, wrinkle and/or twist thereby degrading the appearance of the finished molded article.

Polyester resins having a melting point of 15° C. to 50° C., especially 20° C. to 40° C. less than the melting point of the polybutylene terephthalate resin forming the body of the molded article are preferably employed to form the back-printed film polyester resin. As is well-known, polyester resins are conventionally obtained by the polycondensation of a dicarboxylic acid compound and a dihydroxy compound, the polycondensation of a hydroxycarboxylic acid compound, or the polycondensation of these three components.

Any polyester satisfying the above-mentioned melting point conditions can be used as the back-printed polyester film according to the present invention. Of these, polyester copolymers whose polymer backbone is comprised of between 60 to 99 mole % of the same polymer units as those of the polybutylene terephthalate resin constituting the body molded article—i.e., butylene terephthalate units—is ordinarily preferred.

Polyesters comprising butylene terephthalate units can be obtained by using terephthalic acid or an ester-forming derivative thereof, and butanediol as the main reaction components, adding to these main reaction components a comonomer selected from dicarboxylic acid compounds such as isophthalic acid, adipic acid or sebacic acid, ester-forming derivatives thereof, and diol compounds such as hexanediol, pentanediol, octanediol or polyalkylene glycols, followed by reacting all such components. An especially preferred polyester copolymer is obtained by reacting a dicarboxylic acid component composed mainly of (A) terephthalic acid or an ester-forming derivative thereof and (B) isophthalic acid or an ester-forming derivative thereof, the (A)/(B) molar ration being from 95/5 to 70/30, with a diol component composed mainly of butanediol.

Another preferred polyester copolymer can be obtained by reacting a dicarboxylic acid component composed mainly of terephthalic acid or an ester-forming derivative thereof, with a diol component composed mainly of butanediol and hexanediol.

Known additives typically employed in thermoplastic resins, for example, stabilizers such as antioxidants and ultraviolet absorbers, plasticizers, antistatic agents, surface active agents, crystallization promoters, inorganic fillers, and other thermoplastic resins, can be blended with the PBT resin depending upon the properties that are desired. When these additives are used, consideration must be given to the additive types and amounts so that the intended effect of the present invention is not diminished. Incorporation of an additive that either degrades the transparency of the film (i.e., colors) and/or inhibits the film's adhesion to the substrate body of injection-molded resin must especially be avoided.

An adhesive may be optionally applied onto the printed surface of the film. Any suitable adhesive (sometimes called an "anchoring agent") typically used for lamination of films and sheets can be employed as the adhesive in accordance with the present invention. For example, polyethyleneimine adhesives, organic titanium compound adhesives, polyolefin adhesives, polybutadiene adhesives, isocyanate adhesives and polyester adhesives may be used. In terms of the improvements in the adhesiveness between the film and filled resin, as well as improved heat, moisture and hot water resistances, isocyanate adhesives and polyester adhesives are preferably used in the present invention.

The pattern-printed polyester film may be placed in the mold cavity using electrostatic charging or vacuum techniques. In the former technique, the film is electrostatically charged opposite to the mold so that strong electrostatic attraction forces will assist in the placement of the film in the mold cavity. In the latter technique, a vacuum is drawn between the film and the mold to cause the film to be drawn into conformance with the mold surface. By these techniques, reliable placement of the film within the mold cavity is assured.

The thickness of the film is not particularly critical. However, if the thickness of the film is too small, there is a risk that the film will break or wrinkle when the molten resin is injected into the mold cavity. On the other hand, if the thickness of the film is too large, the film loses its transparency thereby degrading the sharpness of the back-printed pattern. Accordingly, it is preferred that the thickness of the film be between 20 to 200 μm, especially between 50 to 100 μm.

With the film properly placed in the mold cavity (i.e., at a position corresponding to that portion of the resulting injection-molded article's surface intended to bear the pattern film), the molten PBT resin is then injected into the mold cavity so as to fill the same. The patterned film is thus bonded and integrated to the injected resin by the heat energy and pressure of the injection molding process. The polybutylene terephthalate resin used to form the body of the molded articles according to the present invention can be obtained by polycondensing 1,4-butanediol and terephthalic acid or an ester-forming derivative thereof, as is well-known. In addition, polybutylene terephthalate copolymers comprised of butylene terephthalate units as the main structural units, or a product formed by modifying such copolymers by grafting or crosslinking, can be used as the resin which forms the body of the molded article according to the present invention.

Materials typically added to ordinary thermoplastic resins can also be incorporated into the PBT resin forming the substrate body. Examples of such additives include those mentioned above with respect to the patterned film, as well as flame retardants, flame retardant assistants, pigments and fibrous, plate-shaped or powdery fillers such as glass fibers, carbon fibers, glass flakes, mica powder, glass beads or talc powder.

Conditions ordinarily adopted for the injection molding of polybutylene terephthalate resins, such as the temperatures of the mold and resin, the injection pressure, and/or the injection speed can be adopted as the conditions used for injection-molding the molten PBT resin into the film-lined mold cavity according to the present invention. Of these conditions, the injection speed has been found to be most important. In this regard, if the injection speed is too low, the resin's moldability is drastically degraded. In view of the balance between the adhesion and moldability, it is thus preferred that the injection speed be between 0.5 to 3.0 m/min, especially between 1.0 to 2.0 m/min.

It has also been found that the size and position of the gate influences the finished state (e.g. film tearing and/or wrinkling) of the surface-patterned molded article having a pictorial pattern formed thereon. From this viewpoint, it is preferred that a single-point gate be used and that the gate be disposed on a side of the mold opposite to the film and in confronting relationship generally at the film's center.

The size of the gate depends on the size of the molded article and the size of the film that forms the pattern. In this regard, it is preferred that the cross-sectional area of the gate be between 1.5 to 300 mm$^2$, especially between 7 to 200 mm$^2$. The geometric shape of the gate is not particularly critical. Thus, circular, ellipsoidal, square and rectangular gate shapes can be appropriately adopted according to the shape of the molded article and/or the shape of the pattern-printed film. If the pattern-printed film is relatively long and narrow, a special gate such as a film gate can be adopted. Furthermore, in the case where a number of films are used to impart a desired patterns to a single molded article, it is preferred that a respective gate be provided for each printed film used.

The surface-patterned injection-molded polybutylene terephthalate resin article which is prepared according to the above-mentioned process exhibits good adhesion between the film and the PBT resin substrate body as well as good surface appearance characteristics.

Moreover, the surface-printed injection-molded article of polybutylene terephthalate of the invention exhibits excellent resistance to heat and hot water, as well as improved strength and rigidity properties not possessed by conventional foil-decorated molded articles. Accordingly, new end uses of foil-decorated molded articles can be developed due to the present invention. The molded articles of the present invention are further characterized in that no odor migration between the food and the molded article occurs. Therefore, the molded articles of the present invention may be suitably used as tableware, food vessels, or food trays.

EXAMPLES

The present invention will now be described in detail with reference to the following non-limiting Examples.

In the following Examples, film adhesion was evaluated by the following square-cut peeling test (according to JIS K-5400). In this regard, square cuts were formed at intervals of 2 mm between a region close to the gate (i.e., region X in FIG. 1A) and a region distant from the gate (i.e., region Y in FIG. 1A). A tape was then applied to the film and peeled away. Film adhesion was evaluated based on the number of film squares that were removed, with the result being expressed by the number of removed squares per 100 squares).

Detergent resistance was evaluated by repeatedly washing (10 times) the samples in 80° C. water with an alkaline detergent for 20 minutes and then dried in hot air. The detergent resistance was then evaluated using the peel test described above using region X.

EXAMPLES 1 THROUGH 7 AND COMPARATIVE EXAMPLES 1 AND 2

Figure 1B:
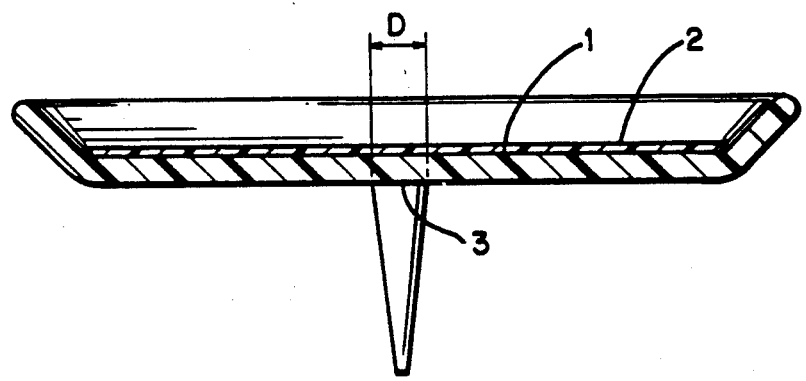
FIG. 1B is a cross-sectional side elevation view of the surface-patterned vessel (tray) shown in FIG. 1A as taken along line B—B therein.

Films (having a thickness of 70 μm) formed of a polyester having a melting point 10° C. to 60° C. less than the melting point of the resin forming the body of an injection-molded article as shown in Table 1, and back-printed with a pictorial pattern, were placed in the cavity of a mold so that the printed surface of the film would come into contact with the injected resin. A polybutylene terephthalate resin (PBT) was then injected into the mold to obtain a molded article in the form of a tray T (250 mm×200 mm×3 mm) having a pictorial pattern formed on the inner face of its flat portion 2, as shown in FIGS. 1A and 1B.

The melting points of the polyester resins used as the back-printed films as listed in Table 1 were determined by measuring the endothermic peaks by using DSC. In this regard, the following polyesters were used:

P$_1$: polyester copolymer obtained by reacting a dicarboxylic acid component comprising terephthalic acid and isophthalic acid at a molar ratio of 87.5/12.5 with 1,4-butanediol as the diol component.

P$_2$: polyester copolymer obtained by reacting a decarboxylic acid component comprising terephthalic acid and isophthalic acid at a molar ratio of 85/15 with 1,4-butanediol as the diol component.

P$_3$: polyester copolymer obtained by reacting a dicarboxylic acid component comprising terephthalic acid and isophthalic acid at a molar ratio of 80/20 with 1,4-butanediol as the diol component.

P$_4$: polyester copolymer obtained by reacting terephthalic acid as the dicarboxylic acid with a diol component comprising 1,4-butanediol and hexanediol.

The temperatures of the molten PBT resin injected into the mold, and the mold were 260° C. and 60° C., respectively, and the injection molding pressure was 500 kg/cm$^2$. The gate size and injection speed during molding were varied as shown in Table 1. Neither warping nor deformation was found in any of the molded articles, and each molded article had a good appearance. The evaluation results are shown in Table 1.

For comparison, molded articles were similarly prepared using a film composed of PBT or polyethylene terephthalate whose melting points were outside the range of 10° C. to 60° C. less than the melting point of the PBT resin forming the body of the injection-molded articles. The evaluation results of such comparison are also shown in Table 1 as Comparative Examples 1 and 2, respectively.

TABLE 1

| | | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|---|
| Film-constituting polyester film | kind | P$_1$ | P$_2$ | P$_3$ | P$_1$ | P$_1$ | P$_4$ | P$_1$ | PBT | PET |
| | m.p. (°C.) | 205 | 200 | 190 | 205 | 205 | 205 | 205 | 228 | 260 |
| Filled resin | kind | PBT | PBT | PBT | PBT | PBT | PBT | PBT | PBT | PBT |
| | m.p. (°C.) | 228 | 228 | 228 | 228 | 228 | 228 | 228 | 228 | 228 |
| Adhesive | | — | — | — | — | — | — | isocyanate type*4 | — | — |
| Gate size (mm$^2$)*1 | | 28 | 28 | 28 | 28 | 13 | 28 | 28 | 28 | 28 |
| Injection speed (m/min) | | 1.5 | 1.5 | 1.5 | 2.5 | 1.5 | 1.5 | 1.5 | 1.5 | 1.5 |
| Results of evaluation | peeling test of cut squares point X | 0/100 | 0/100 | 0/100 | 0/100 | 0/100 | 0/100 | 0/100 | 0/100 | 100/100 |
| | point Y | 0/100 | 0/100 | 0/100 | 0/100 | 0/100 | 0/100 | 0/100 | 0/100 | 100/100 |
| | appearance after hot water treatment*2 | 10 | 10 | 10 | 10 | 10 | 10 | 10 | 9 | — |
| | peeling test after hot water treatment*3 point X | 0/100 | 0/100 | 0/100 | 2/100 | 3/100 | 0/100 | 0/100 | 26/100 | — |
| | point Y | 2/100 | 3/100 | 2/100 | 5/100 | 4/100 | 3/100 | 0/100 | 32/100 | — |
| | detergent point X | 3/100 | 4/100 | 4/100 | 8/100 | 7/100 | 5/100 | 0/100 | 47/100 | — |

TABLE 1-continued

|  | Ex. 1 | Ex. 2 | Ex. 3 | Ex. 4 | Ex. 5 | Ex. 6 | Ex. 7 | Comp. Ex. 1 | Comp. Ex. 2 |
| --- | --- | --- | --- | --- | --- | --- | --- | --- | --- |
| resistance | | | | | | | | | |

Notes For Table 1:
*[1]The size at the intersection of the tray (i.e., the location identified by reference numeral 3 in FIG. 1B). In each Example, a single-point gate having a circular cross-sectional shape and diameter D was disposed at a point confronting the center of the film.
*[2]Sharpness of the pictorial pattern, peeling or wrinkling of the film were checked after heating in hot water at 95° C. for 1 hour. The appearances were qualitatively evaluated by a 10-point method where 10 was the best and 1 was the worst.
*[3]The adhesion of the film after the hot water treatment described in Note 2.
*[4]An adhesive comprising a main component containing polyester polyol and a curing agent containing trimethylolpropane/tolylene diisocyanate adduct.

EXAMPLE 8

Figure 2:
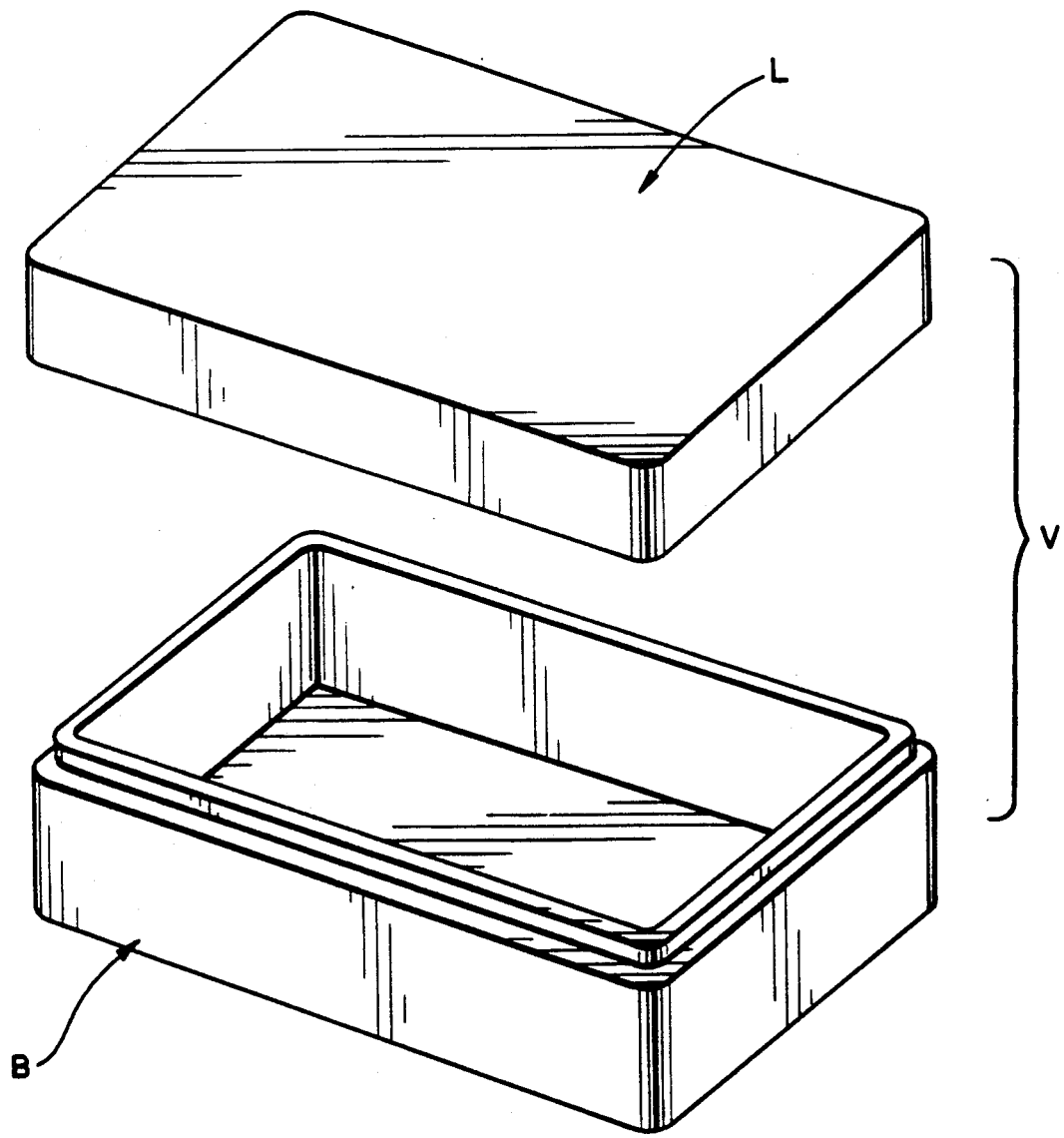
FIG. 2 is a perspective view of a body and lid of a vessel employed in certain of the following Examples.

In order to examine odor migration that may occur in the case of tableware, food vessels or the like, vessels V having a body B and a lid L as shown in FIG. 2 were molded using a polybutylene terephthalate resin. A pictorial pattern was formed on the top surface of the lid L in the same manner as Example 1. Water, oil or curry was placed in the body B of the vessel V, and the lid L was then positioned onto the body B so as to close the same. The closed vessel V was then heated at 95° C. Migration of odor to the contents from the vessel V was not observed, and thus it was confirmed that the vessel V resisted odor migration. In addition, adhesion of the pictorial pattern film bonded to the top surface of the lid L was not detrimentally affected.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A surface-patterned injection-molded polybutylene terephthalate resin article comprised of a substrate body which consists essentially of polybutylene terephthalate resin, and a transparent thermoplastic polyester film having a predetermined thickness and a selected pattern printed upon a surface thereof, said film being integrally bonded to a surface region of said substrate body such that said printed surface of said film is positioned adjacent said predetermined substrate body surface, whereby said printed pattern is visible through the thickness of the film, and wherein said polyester film has a melting point that is between 10° C. to 60° C. less than the melting point of said polybutylene terephthalate resin forming said substrate body.

2. A surface-patterned injection-molded article as in claim 1, wherein the polyester resin forming said film contains between 60 to 90 mole % of butylene terephthalate recurring units in its polymer backbone.

3. A surface-patterned injection-molded article as in claim 1, wherein the polyester resin forming said film is the reaction product of a dicarboxylic acid component composed mainly of (A) terephthalic acid or an ester-forming derivative thereof, and (B) isophthalic acid or an ester-forming derivative thereof, with a diol component composed mainly of butanediol, and wherein the molar ratio of the dicarboxylic acid components (A)/(B) is between 95/5 and 70/30.

4. A surface-patterned injection-molded article as in claim 1 or 3, wherein the thickness of the back-printed film is between 20 to 2000 μm.

5. A surface-patterned injection-molded article as in claim 1, in the form of tableware, a food vessel, or a food tray.

6. A process for preparing an injection-molded surface-patterned polybutylene terephthalate article comprising:
placing a film comprised of a polyester resin and back-printed with a desired pattern into a mold such that the unprinted side of the film is in contact with the mold surface and the back-printed side of the film is exposed to the mold cavity, and then
injecting molten polybutylene terephthalate resin into the mold cavity so as to contact the back-printed side of the film, and allowing the film to integrally bond to the injection-molded polybutylene terephthalate resin, wherein
the polyester film has a melting point that is between 10° C. to 60° C. less than the melting point of the injected polybutylene terephthalate resin.

7. A process as in claim 6, wherein the polyester resin forming said film contains between 60 to 90 mole % of butylene terephthalate recurring units in its polymer backbone.

8. A process as in claim 6, wherein the polyester resin forming said film is the reaction product of a dicarboxylic acid component composed mainly of (A) terephthalic acid or an ester-forming derivative thereof, and (B) isophthalic acid or an ester-forming derivative thereof, with a diol component composed mainly of butanediol, and wherein the molar ratio of the dicarboxylic acid components (A)/(B) is between 95/5 and 70/30.

9. A process as in claim 6, wherein said step of injecting the polybutylene terephthalate resin includes using a single point gate having a cross-sectional area of between 1.5 to 300 mm$^2$.

10. A process as in claim 9, wherein said step of injecting the polybutylene terephthalate resin includes positioning the gate so as to be in opposing relationship to a central portion of the film in the mold cavity.

11. A process as in claim 6 or 10, wherein wherein the thickness of the back-printed film is between 20 to 200 μm.

12. A process as in claim 6, wherein the step of injection-molding is carried out at a molten polybutylene terephthalate injecting speed of between 0.5 to 3.0 m/min.

13. A process for producing an injection-molded article having a polybutylene terephthalate body, and having a rear surface-patterned polyester film adhered to at least a selected surface portion of said body, said process comprising:
lining a region of a mold cavity corresponding to said selected surface portion of the article with a rear surface-printed thermoplastic polyester film having a melting point that is between 10° C. to 60° C. less than the melting point of the polybutylene terephthalate resin body by placing the front surface of the film against the mold so that the rear surface of the film is exposed to the mold cavity; and then injecting a polybutylene terephthalate resin into the film-lined mold cavity at or above its melting point so as to cause said lower melting point polyester film to at least partially plasticize and to thereby integrally bond to the said injected polybutylene terephthalate resin body.

* * * * *

UNITED STATES PATENT AND TRADEMARK OFFICE
CERTIFICATE OF CORRECTION

PATENT NO. :   5,108,818
DATED      :   April 28, 1992
INVENTOR(S) :  Yoichi EBINA, et al It is certified that error appears in the above-identified patent and that said Letters Patent is hereby corrected as shown below:

Column 3, line 35, change "ration" to read --ratio--.

Column 6, line 25, change "decarboxylic" to read --dicarboxylic--.

Signed and Sealed this

Tenth Day of August, 1993

Attest:

MICHAEL K. KIRK

Attesting Officer

Acting Commissioner of Patents and Trademarks